Patented Sept. 26, 1939

2,174,506

UNITED STATES PATENT OFFICE 2,174,506

PROCESS OF REACTING ALICYCLIC HYDROCARBONS WITH CHLORINE AND SULPHUR DIOXIDE AND PRODUCTS THEREOF

Arthur L. Fox, Woodstown, N. J., assignor to E. I. du Pont de Nemours & Company, Wilmington, Del., a corporation of Delaware No Drawing. Application June 30, 1938,
Serial No. 216,837

21 Claims. (Cl. 260—503)

This invention relates to the preparation of new chemical compounds and compositions from alicyclic hydrocarbons and their derivatives. More particularly it relates to the preparation of saturated alicyclic sulphonyl chlorides and derivatives thereof. In a more limited sense, it relates to the preparation of surface active products and compositions from liquid or easily liquefiable saturated alicyclic hydrocarbons and mixtures thereof by reacting them with sulphur dioxide and chlorine gases and hydrolyzing the reaction product.

This invention has for an object the preparation of new compounds and compositions. A further object is the preparation of surface active compounds and compositions from saturated alicyclic hydrocarbons. A still further object is the preparation of alicyclic sulphonyl chlorides by a simple reaction. A still further object is the preparation of alicyclic hydrocarbon sulphonyl chlorides involving cheap reactants and simple apparatus. Still other objects will appear hereinafter.

The above and other objects of this invention are accomplished by treating liquid alicyclic compounds with a gaseous mixture of sulphur dioxide and chlorine. The reaction zone is preferably under the catalyzing influence of light and maintained at moderate temperatures.

It has been found that when saturated liquid or easily liquefiable alicyclic compounds, particularly hydrocarbons such as terpanes (i. e., fully hydrogenated terpenes), cyclohexane, decahydro-naphthalene, naphthenes, etc., are treated with a mixture of sulphur dioxide and chlorine, there is introduced into these molecules a sulphonyl chloride group.

There may be also introduced varying quantities of halogen, which enters because of a side reaction to form chlor hydrocarbon sulphonyl chlorides and chlor-hydrocarbons. Di and polysulphonyl chlorides and other products are also formed.

It has been further found according to this invention that depending on the ratio of the sulphur dioxide to chlorine and also dependent somewhat on the raw material being used, that the concurrent chlorination reaction may be substantially reduced, so that one may obtain essentially pure sulphonyl chlorides. In certain cases, such as cyclohexane, there is only one structural mono isomer produced, but in the case of other alicyclic compounds such as the naphthenes or deca-naphthalene, there are formed numerous hydrocarbon sulphonyl chloride and chlorhydrocarbon sulphonyl chloride isomers, which are new compounds and mixtures.

In carrying out the invention, one may use an amount of 1 to 20 mols, preferably from 1.5 to 6 mols and still more preferably 2.5 to 3.5 mols of sulphur dioxide per mol of chlorine. These gases are mixed in a suitable chamber and passed directly into the reaction chamber containing the alicyclic compound which is preferably in the liquid state by bubbling the gases therethrough. An incandescent light bulb is placed from 1 to 36 inches from the reaction mass and this has a very strong catalytic influence increasing the speed of introduction of sulphonyl chloride groups. The sulphur-dioxide-chlorine mixture is introduced into the reaction mass in some manner calculated to cause a high degree of dispersion of the gas bubbles, such as through a porous material or under the influence of agitation. These precautions are not necessary for the reaction to run but are highly desirable since they tend to give a much greater efficiency. After the gases have been passed in until the reaction has gained a weight which is predetermined by the products desired, the reaction is stopped and the reaction mass is aerated with some inert gas such as carbon dioxide, nitrogen, sulphur dioxide, etc. to remove undesirable constituents therefrom.

There is a large variety of alicyclic compounds and as is to be expected this reaction works more efficiently with certain of these than with certain others, such as, for example, naphthenes and abietanes. In these cases the chlorination reaction which runs concurrently with the sulphonyl chloride reaction is much more rapid than the sulphonation, and therefore, products containing higher quantities of chlorine per atom of sulphur are obtained as well as chlorinated naphthenes.

The invention will be further illustrated but is not intended to be limited by the following examples in which the parts stated are parts by weight:

*Example I*

Four hundred grams of a naphthene fraction having a gravity A. P. I. at 60° F. of 39.4, a boiling range of 383° to 401° F., and containing 96% naphthenes and having an average of 12 carbon atoms per molecule, was treated with a mixture of sulphur dioxide and chlorine for 4 hours under the influence of light from 4–40 watt electric light bulbs during which time a total of 1300 g. of sulphur dioxide and 386 g. chlorine were used. The gain in weight was 238 g. At this point a sample of the material treated with sodium hydroxide reacted to give a completely water soluble product. The main reaction mass was blown with dry nitrogen losing 10 g. in weight. Analysis of the crude product, chlorine 20.6%, sulfur 7.6%. This is a ratio of one sulphur to 2.45 chlorine atoms.

Two hundred g. of the above crude product were hydrolyzed requiring 110 cc. of 10 normal sodium hydroxide to give a permanent alkalinity. The hydrolysate was diluted to two liters using 500 cc. alcohol and the rest water. This operation threw out an oil which was separated and weighed 74 g. The oil contained 17.35% chlorine and .17% sulphur. This analysis indicated that the portion of the original product which contained both sulphur and chlorine had a ratio of 1 sulphur to 1.71 chlorine atoms. Basing the molecular weight of the naphthene fraction on the formula $C_{12}H_{24}$, this analysis indicates there was 1.4 sulphonyl chloride groups per hydrocarbon residue and 2.4 chlorine atoms per hydrocarbon residue.

Example II

Four hundred and six grams of naphthene fraction having a gravity A. P. I. at 60° F. of 34.1, a boiling range of 468° to 483° F. and containing 94% naphthenes having an average of 15 carbon atoms per molecule, were treated with chlorine and sulphur dioxide for 3½ hours under the influence of light from 4–40 watt electric light bulbs during which time 951 g. sulphur dioxide and 470 g. chlorine were used. The gain in weight was 400 g. The analysis of the crude product was chlorine 27.9% and sulfur 8.2%.

Two hundred grams of the above product were hydrolyzed with 10 normal caustic taking 150 cc. to give permanent alkalinity. The product was then diluted to 2 liters using 500 cc. alcohol, and the rest water causing 55 g. oil to separate. This oil contained 28.06% and .2% sulphur. Using the amount of chlor naphthene thus determined and correcting the analysis of the total crude product, one obtains an analysis of the product containing sulphur and chlorine of chlorine 27.3% and sulphur 11.3%. This is a ratio of 1 sulphur to 2.8 chlorine atoms and indicates on the basis of a formula of $C_{15}H_{30}$ for the naphthene that there is 1.42 sulphonyl chloride groups and 3.1 atoms chlorine per molecule of naphthene.

Example III

Three hundred grams of deca-hydro-naphthalene were treated with sulphur dioxide and chlorine under the influence of light for 4 hours using a total of 1260 g. sulphur dioxide and 427 g. chlorine. The gain in weight was 316 g. The product was crystal clear and was aerated with nitrogen for 2 hours losing 15 g. The analysis of the product was chlorine 25.19%, sulphur 8.33%. The reaction mixture contained deca hydronaphthalene mono sulphonyl chloride, together with small amounts of chlor-decahydronaphthalene-sulphonyl chloride and chlor-decahydronaphthalene.

Example IV

A mixture of 902 g. of $SO_2$ and 297 g. of $Cl_2$ were passed in a period of four hours through 200 g. of menthane. The temperature was maintained at 40° C. and the reaction illuminated by means of a 60 watt electric light bulb. The product was hydrolyzed and neutralized by addition to 500 g. of 30% caustic soda solution. The product was diluted and the insoluble oil, which separated, removed. The aqueous solution was filtered.

The product was soluble in 52° Tw. caustic soda solution. It possessed strong wetting out properties in that solution.

Example V

Three hundred and eighty grams of camphane were placed in a flask and heated to 70° and a mixture of sulphur dioxide and chlorine passed through for 18 hours under the influence of light from four 40 watt electric light bulbs. The total gain in weight was 155 g. The product was aerated with nitrogen and then showed an analysis of chlorine 29.27% and sulphur 13.83%. This indicates 1.53 sulphonyl chloride groups and 2.58 chlorine atoms per camphane molecule. Mono and di sulphonyl chloride derivatives were formed in admixture with chlor camphane sulphonyl chlorides and other products. These products may be hydrolyzed and neutralized as in Example IV.

Example VI

Two hundred and sixty grams of abietane were placed in a 1 liter flask fitted with a condenser, stirrer, thermometer and an inlet tube through which a mixture of sulphur dioxide and chlorine was passed for 20 hours under the influence of light from four 40 watt electric light bulbs. A total of 200 g. gain in weight was shown. This product analyzed chlorine 26.17%, sulphur .84%, indicating that the chlorination reaction was very much more rapid than sulphonation reaction.

Example VII

Two hundred grams of pinane was treated with a mixture of sulphur dioxide and chlorine for two hours, the gain in weight being 218 g. The product was then aerated with nitrogen for 8 hours and lost 58 g. The analysis of the product was 33.2% chlorine and 5.9 sulphur. On hydrolysis 51% of the product solubilized.

Example VIII

Five hundred grams of cyclohexane were placed in a 1 liter glass vessel provided with reflux means and a mixture of sulphur dioxide and chlorine was passed in through a sintered glass distributor for 5¾ hours under the influence of light from 4–40 watt electric light bulbs. The temperature rose to 80° during the operation and then reached equilibrium, no further cooling being employed. The total amount of sulphur dioxide used was 1066 g. (16.6 mols.) and the total chlorine was 497 g. (7 mols). A white precipitate formed which was filtered off at room temperature and weighed (12 g.). Analysis of the precipitate, chlorine 22.15%, sulphur 21.22%, melting point decomposes at 145. This corresponds to a slightly impure cyclo hexane disulphonyl chloride. The main portion of the reaction product was aerated with nitrogen and was then evaporated under vacuum on a steam bath to remove any unchanged cyclohexane. The residue from this evaporation under vacuum weighed 425 g. Analysis, chlorine 25.62%, sulphur 16.54%. This corresponds to a mixture of 40% chloro cyclohexane sulphonyl chloride and 60% cyclo hexane sulphonyl chloride.

Example IX

Five hundred grams of cyclohexanol were treated with a mixture of sulphur dioxide and chlorine for 14 hours under the influence of light from 4–40 watt electric light bulbs. The gain in weight was 455 g. During this run there was a total of 1543 g. sulphur dioxide and 707 g. chlorine passed into the reaction mass. The crude product was placed under a vacuum for three days at room temperature and lost 64 g. in weight, so that the net gain was 291 g. The analysis of the product was chlorine 29.20%, sulphur 7.38%. This corresponds to .4 sulphonyl chloride groups and 1.43 chlorine atoms per hydrocarbon molecule.

Example X

Twenty-five grams of hexa-hydro-benzoic acid were treated with a gaseous mixture of $SO_2$ and $Cl_2$ for four hours at a temperature of 40-45° under the influence of light from two 40 watt electric lights. During this time the gain in weight was 15 g. and there was used 835 g. $SO_2$ and 258 g. $Cl_2$. The product was aerated with nitrogen.

Analysis Cl 14.0%, S 10.2%. This analysis indicates that 60% of the product was converted into a sulphonyl chloride..

Example XI

A mixture of $SO_2$ and $Cl_2$ gases was passed through fifty-grams of cyclohexyl bromide for four hours at which time the gain in weight was 24 g. A total of 951 g. $SO_2$ and 280 g. $Cl_2$ was used. The product which is a chloro-bromo-cyclohexane sulphonyl chloride analyzed 22.7% Cl, 6.7% S and 28.4% Br.

This product hydrolyzed easily with caustic to give a water-soluble product.

In place of the above alicyclic compounds, various others may be substituted, thus one or more alkyl, halogen, and hydroxy groups may be present in the hydrocarbon nuclei. Thus, dodecyl cyclohexane, isopropyl menthane, hydroxy abietane, chloro menthane, hydroxy camphane, chloro deca-hydro naphthalene, methyl cyclohexanol, and N-diethyl cyclohexyl amine, etc., are useful. Other hydrocarbons, e. g., tetradecahydro anthracene, etc., may be used.

It is to be understood that the invention is not limited to the above described modes of operation. The conditions of the reaction can be varied widely within the scope of the invention. Thus, the proportions of sulphur dioxide and chlorine can be varied from 1 to 20 mols of sulphur dioxide to one of chlorine, although 2 to 6 mols and 2.5 to 3.5 mols of the former are respectively preferred. The time of treatment and the amount of gases passed can be varied. Sometimes a rapid flow of gases for a short time may be advantageous while again a slow flow of gases and a long reaction time may be necessary. A temperature anywhere from 0° to 100° C. may be employed. Temperatures of 30° to 80° C. are preferred.

This invention is not to be limited to the hydrolysis procedure set forth in the examples. For instance, the concentration of caustic soda used for hydrolyzing the reaction product obtained by treating hydrocarbon with a gaseous mixture of sulphur dioxide and chloride may be varied from 5% to 50%. The reaction is somewhat slower with the more dilute caustic soda solutions and almost instantaneous with the more concentrated solutions. Other alkali metal hydroxides such as potassium, calcium, etc., may be used. Likewise, the alkaline earth hydroxides and oxides may be employed. An aqueous solution of ammonium hydroxide may be used to yield the ammonium salt. Substituted ammonium salts or amine salts may be obtained by hydrolyzing the product with aqueous solutions of aliphatic, cycloaliphatic, aromatic and heterocyclic amines, such as dimethylamine, ethylamine, diethylamine and triethanolamine, piperidine, diethyl-cyclohexylamine, pyridine, aniline, toluidine, xylidines, β-naphthyl amine, etc. Thus, the amine salts of chlormenthane sulphonic acid may be obtained. Also, the strong quaternary ammonium bases such as tetra-methyl-ammonium-hydroxide and tetraethyl-ammonium-hydroxide may be used for the hydrolysis. The resulting products would be the tetra-methyl-ammonium salt or the tetra-ethyl-ammonium salt of chlor-menthane sulphonic acid. The preferred salt for use in mercerizing liquors is, of course, the sodium salt. For use in acid or salt solutions one of the amine or quaternary ammonium salts may be more desirable as possessing greater solubility.

Water-miscible organic solvents may be used during the hydrolysis or neutralization step to promote contact between the reaction mass and the hydrolyzing agents. As examples of such solvents or diluents may be mentioned ethyl, propyl, methyl, etc., alcohols, dioxane, glycol, and its ethers and esters, e. g., ethylene glycol diethyl ether, ethylene glycol dimethyl ether, etc.

While the apparatus described in the examples was chosen primarily because it was easily adapted for use in the laboratory it is obvious that other types may be use, particularly when it is to be carried out upon a commercial scale. Any of the corrosion resisting materials used for chemical apparatus may be employed. As examples of such materials, mention is made of enamel, nickel and nickel alloys. Means for distributing the gases may include porous diaphragms, perforated coils or similar devices which may be used alone or in conjunction with suitable agitators.

Instead of a closed vessel provided with a reflux condenser, one may use a long narrow tube. The tube may be partially filled with alicyclic compounds and chlorine and sulphur dioxide may be bubbled into the bottom thereof. A countercurrent process as described and claimed in an application for Letters Patent of William H. Lockwood and Joseph L. Richmond, Serial No. 216,843, entitled "Continuous process" may be resorted to. The reaction tubes can be packed with any device suitable for carrying out the reaction of a liquid with a gas, e. g., Raschig rings, broken glass, etc.

Various changes in the reaction conditions can be made. The reaction can be run under the influence of light, either the ordinary light of the room, in bright sunlight, under powerful incandescent or arc lamps, or under strong ultra-violet or infrared radiation. Thus clear or frosted electric light bulbs, carbon arcs including metal cored and metal salt cored carbon arcs and rare gas lamps may be used. Catalyst may be used alone or in conjunction therewith.

The reaction zone may be maintained at atmospheric pressure or below, but is preferably carried out at atmospheric pressure or any pressure above so long as the chlorine and sulphur dioxide remain gaseous at the reaction temperature.

The final product can be worked up in a number of ways. It can be left as a solution containing insoluble oil or a solution with the insoluble oil removed. The product can be spray- or drum-dried and applied as such, or standardized with some innocuous diluent. If a particularly pure product is desired, the drum dried product can be extracted with hot alcohol and the alcoholic extract evaporated to give a pure 100% product free of inorganic salts. Further, unreacted oil can be removed by diluting the hydrolyzed solution and separating. The oil can be extracted by means of a water immiscible solvent or it can be removed by steam distillation.

The products prepared according to this invention serve as intermediates for the preparation of numerous derivatives such as, for example, alicyclic sulphonic acids, sulphinic acids, amides, sulphonyl esters, mercaptans, etc., which may be useful as mercerizing assistants, plasticizers for paints, nitro cellulose lacquers, varnishes, Cellophane, etc., corrosion inhibitors, gum solvents for gasoline, extractants for the refining of oils and gasoline, pour point depressants, insecticides, fly spray ingredients, weed killers, soil fumigants, cotton immunization chemicals, anti-shrinking agents for wool, foaming agents, mold inhibitors, crease-proofing agents, viscose modifiers, pharmaceuticals, detergents, wetting agents, rewetting agents, for improving textile treating processes including wool scouring, carbonizing, fulling, sizing, desizing, bleaching, mordanting, lime soap dispersing, improvement of absorption, delustering, degumming, kier-boiling, felting, oiling, lubricating, resisting cotton in an acid bath, dyeing, printing, stripping, creping, scouring viscose rayon, etc. They may also be useful in improving dye compositions, printing pastes, the preparation of lakes, the preparation of inorganic pigments and household dye preparations. They may also be useful in improving processes of dyeing leather and textiles including dyeing with developed dyes, dyeing in neutral, acid or alkaline dye baths, dyeing of animal fibers with vat dyes, etc. They may also be useful in treating oil wells and to improve flooding oil bearing sands. They may also be used to improve radiator cleaning compositions, cleansing compositions as household detergent compositions, shampoos, dentrifices, washing of paper mill felts, etc. They may also be used to improve fat liquoring and leather treatment processes as well as for fat splitting agents. They may be useful in improving the preservation of green fodder. They may also be useful in improving the removal of fibrous layers from surfaces and in metal cleaning. They may also be used to improve flotation processes of ores, pigments, coal, etc. They may be useful in breaking petroleum emulsions or in different concentrations as his emulsifying agents. They may also be useful in improving food preparations. They may be useful in improving the cooking of wood pulp. They may also be useful in providing improved ceramic assistants and processes to improve the setting of cement. They may be useful in storage batteries and dry cells. Other uses for these products or their derivatives are as fungicides, accelerators, delusterants, extreme pressure lubricants, moth proofing agents, antiseptics, fire-proofing agents, mildew preventers, penetrating agents, anti-flexing agents, tanning agent, lathering agent, dust collecting agents, anti-oxidant, color stabilizer in gasoline, etc.

The surface activity of some of the agents may be enhanced by electrolytes or by the addition of other surface-active agents, e. g., alkylated naphthalene sulphonic acids and their water-soluble salts, salts of higher alkyl sulphuric acid esters as described in Bertsch Patents Nos. 1,968,794 to 1,968,797, long chain betaine derivatives both of the C- and N- and open type which are illustrated by Daimler et al. Patent No. 2,082,275, Balle et al. Patent 2,087,565, Platz et al. Patent 2,097,864 and Balle et al. Patent 2,101,524, long chain ammonium, sulphonium, and phosphonium compounds, as well as numerous other soap substitutes.

The hydrolysis and neutralization products of water-soluble salts obtained from the above-described sulphonyl chlorides may be used in admixture with one another and/or in admixture with soap and/or soap substitutes of the prior art, for the various purposes wherein soap and/or soap substitutes have previously been used or are capable of use. A few representative uses are set forth in Reed application Serial No. 216,332, filed June 28, 1938, and it is to be understood that the products produced according to this invention may be substituted in like amount.

As many apparently widely different embodiments of this invention may be made without departing from the spirit and scope thereof, it is to be understood that I do not limit myself to the specific embodiments thereof except as defined in the appended claims.

I claim:

1. A process which comprises reacting an alicyclic compound with a gaseous mixture of sulphur dioxide and chlorine, and recovering an organic substitution product containing sulphur and oxygen.

2. A process which comprises reacting an alicyclic compound in the liquid phase with a gaseous mixture of sulphur dioxide and chlorine, and recovering an organic substitution product containing sulphur and oxygen.

3. A process which comprises reacting a liquid or easily liquefiable alicyclic hydrocarbon with a gaseous mixture of sulphur dioxide and chlorine, and recovering an organic substitution product containing sulphur and oxygen.

4. A process which comprises reacting a non-gaseous alicyclic hydrocarbon with admixed sulphur dioxide and chlorine.

5. A process which comprises reacting a non-gaseous alicyclic hydrocarbon with admixed sulphur dioxide and chlorine in the presence of ultra violet light.

6. A mixture of camphane sulphonyl chlorides and chloro-camphane sulphonyl chlorides.

7. A mixture of pinane sulphonyl chlorides and chloro-pinane sulphonyl chlorides.

8. A process which comprises reacting an alicyclic compound having a hydrocarbon nucleus of at least 5 carbon atoms with a gaseous mixture of sulphur dioxide and chlorine.

9. A process which comprises reacting a liquid alicyclic hydrocarbon with a gaseous mixture of sulphur dioxide and chlorine in the presence of actinic light and at a temperature between 20° and 110°.

10. A process which comprises reacting a mixture of liquid alicyclic hydrocarbons with a gaseous mixture of sulphur dioxide and chlorine in the presence of actinic light and at a temperature between 20° and 110° C.

11. A process which comprises reacting a liquid alicyclic hydrocarbon with a gaseous mixture of sulphur dioxide and chlorine in the presence of actinic light and at a temperature between 20° and 110° C. and recovering an organic sulphonyl chloride derivative therefrom.

12. A process which comprises reacting a liquid alicyclic hydrocarbon with a gaseous mixture of sulphur dioxide and chlorine in the presence of actinic light and at a temperature between 20° and 110° C. and hydrolyzing the organic sulphonyl chloride reaction product.

13. A process which comprises reacting a mixture of liquid alicyclic hydrocarbons with a gaseous mixture of sulphur dioxide and chlorine in the presence of actinic light and at a temperature between 20° and 110° C. and hydrolyzing the organic sulphonyl chloride reaction product.

14. A process which comprises reacting a liquid alicyclic hydrocarbon with a gaseous mixture of sulphur dioxide and chlorine in the presence of actinic light and at a temperature between 20° and 110° C. and hydrolyzing the organic sulphonyl chloride reaction product with a base.

15. A process which comprises reacting a liquid alicyclic hydrocarbon with a gaseous mixture of sulphur dioxide and chlorine in the presence of actinic light and at a temperature between 20° and 110° C. and hydrolyzing and neutralizing the organic sulphonyl chloride reaction product with an alkali metal base.

16. A process as set forth in claim 9 wherein the hydrocarbon is a naphthene.

17. A process as set forth in claim 9 wherein the hydrocarbon is dodecylcyclohexane.

18. A terpane sulphonyl chloride.

19. A mixture of naphthenesulphonyl chlorides and chlornaphthene sulphonyl chlorides.

20. The mixture of alicyclic hydrocarbon sulphonyl chlorides obtained by the process of claim 11.

21. The mixture of hydrolyzed and neutralized alicyclic hydrocarbon sulphonyl chlorides obtained by the process of claim 14.

ARTHUR L. FOX.